United States Patent Office 3,606,736
Patented Sept. 21, 1971

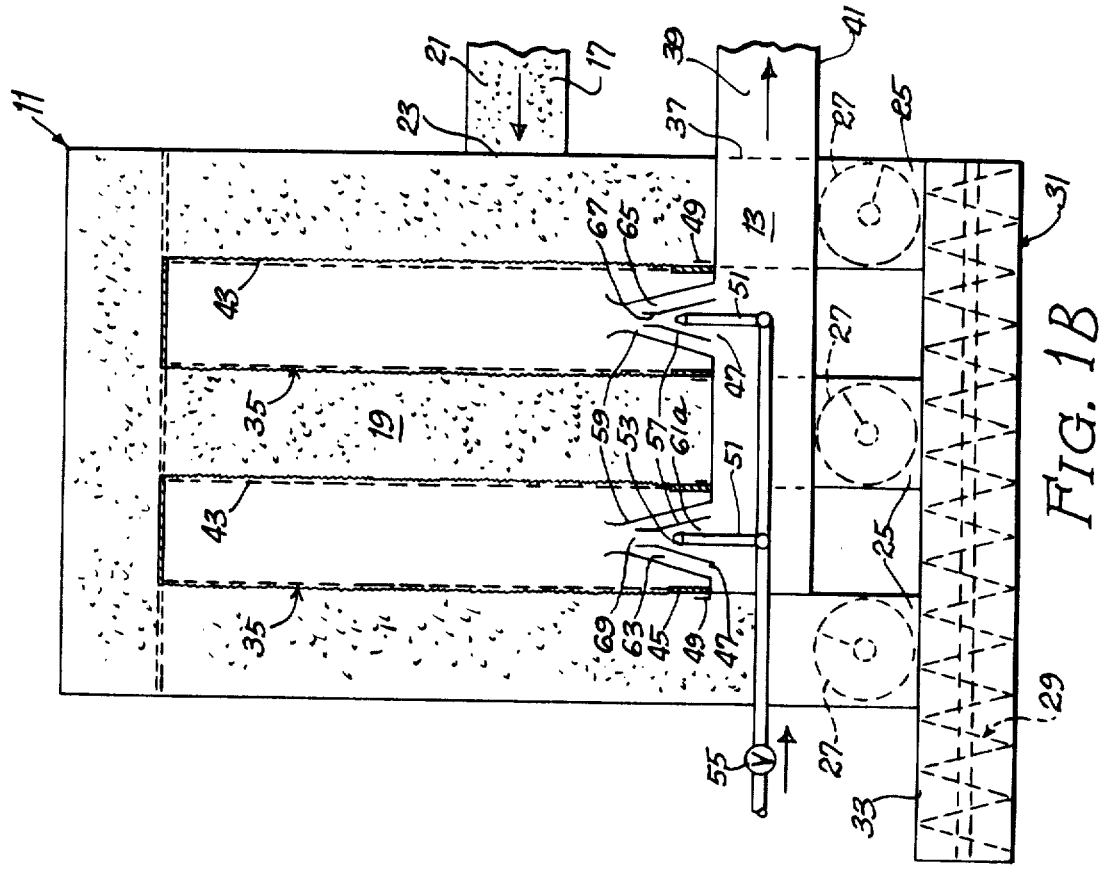

3,606,736
APPARATUS FOR FILTERING SUSPENDED SOILDS FROM GASEOUS MEDIUM AND FOR REMOVAL OF FILTER CAKE FROM FILTER ELEMENTS
Raymond M. Leliaert, South Bend, and Clyde A. Snyder, Mishawaka, Ind., assignors to The Wheelabrator Corporation, Mishawaka, Ind.
Filed June 16, 1969, Ser. No. 833,531
Int. Cl. B01d 46/04
U.S. Cl. 55—302
8 Claims

ABSTRACT OF THE DISCLOSURE

Apparatus for gaseous filtration to effect removal of suspended solids in which use is made of elongate filter elements having an open end and means for flowing gaseous medium containing the suspended solids through the walls of the filter element whereby separated solids collect on the outer wall of the filter element as a filter cake and in which use is made of a gas nozzle in endwise alignment and colinear alignment with one or more auxiliary nozzles followed by a venturi for releasing or generating a burst of gas of high pressure and increasing volume in the interior of the filter tube being cleaned, to effect removal of solids collected on the walls of the tube, without stopping total filter flow.

---

This invention relates to the treatment of gases and vapors for the removal of solids suspended therein. It relates more particularly to a method and apparatus for filtering air or gaseous medium for the removal of dust, dirt and the like solid particles suspended therein.

With reference to the well known processes of filtration wherein use is made of one and preferably a plurality of porous filter tubes or bags through which the gaseous medium to be filtered is passed from an ingoing side to the opposite outgoing side, the solids separated from the gaseous medium build up on the walls of the ingoing side of the tube to form a filter cake. As the filter cake builds up in thickness, the pressure drop across the filter medium increases whereupon it ultimately becomes necessary to effect removal of the filter cake or a greater portion thereof for most efficient operation.

In the past, this has been accomplished in a number of ways. One simple technique has been to make use of a shaking device from which the filter bags or tubes are suspended and operated periodically to shake the bags to loosen the filter cake collected on the surfaces thereof. The dislodged dust or dirt falls gravitationally through the filter chamber to a collecting chamber at the bottom from which it is removed. In order to permit the solids dislodged from the surfaces of the filter tubes to fall gravitationally to the collector at the bottom, it has been necessary to stop filter flow of the dust laden gases, at least in the sections or compartments in which the bags are being cleaned.

In the attempt to achieve more effective removal of the solids entrapped within the walls or pores of the filter bag while dislodging solids forming the filter cake, use has also been made of a process identified as a "back washing" technique wherein the flow of gaseous medium is reversed for flow back through the filter surface from the outgoing side to the ingoing side. This back washing operation is intended to dislodge the filter cake and blow the collected solids from within the pores of the filter surface with corresponding reduction in pressure drop across the filter medium. Again, the back washing process requires that the normal filter flow be terminated in a section or compartment during the back washing operation whereby numerous valves and controls are required for regulating gaseous flow and for proper sequencing of the various operations.

More recently, as described in the Church Pat. Re. 24,954, the need for stopping filter flow in isolated compartments during filter cake removal has been eliminated by the intermittent use of a jet of gas across the open mouths of each of the outgoing side of a portion of the filter tubes in which the jet is applied at a pressure substantially greater than that of the stream of gas to be filtered. As a result, a counterflow is established which generates a sweeping action distending and snapping the filter element, effective to dislodge the filter cake and clean the pores to the extent that pressure drop across the filter surface is markedly reduced. The described removal of solids collected on the filter surface can be effected without interruption of the total filter flow although part of the flow of the filtering gas is temporarily reversed by the jet action. Thus, the described solids removal is generated without the need for the compartmentation, piping and valving systems characteristic of the back washing or shaking operation since the need is only for intermittent release of the burst of high pressure gas.

As in the other systems, the solids dislodged from the filter surface are capable of falling gravitationally to a collecting section from which the solids are removed.

The described filtration system is still subject to a number of deficiencies, such as the use of an excessive amount of high pressure gas, exacting control of distance and dimensions of the various parts for the generation of an effective jet stream, and a characteristic of the system is in the operation at relatively high pressure differentials with corresponding high filter drag, which is a measure of efficiency of operation.

It is an object of this invention to provide a method and apparatus which represents a marked improvement in the jet principle for removal of solids collected on the surfaces of filter elements with considerable savings in pressurized gas with less filter drag, and it is a related object to provide a filtering system of the type described which operates at lower levels of pressure drop across the filter surface and with improved operating efficiency.

These and other objects and advantages of this invention will hereinafter appear and, for purposes of illustration, but not of limitation, embodiments of the invention are shown in the accompanying drawings, in which:

FIG. 1A is a schematic sectional elevational view of a filtering apparatus embodying the features of this invention with the open end of the filter element(s) at the top;

FIG. 1B is a schematic sectional elevational view and plan view of a filtering apparatus embodying the features of this invention with the open end of the filter element(s) at the bottom;

Figure 1C:
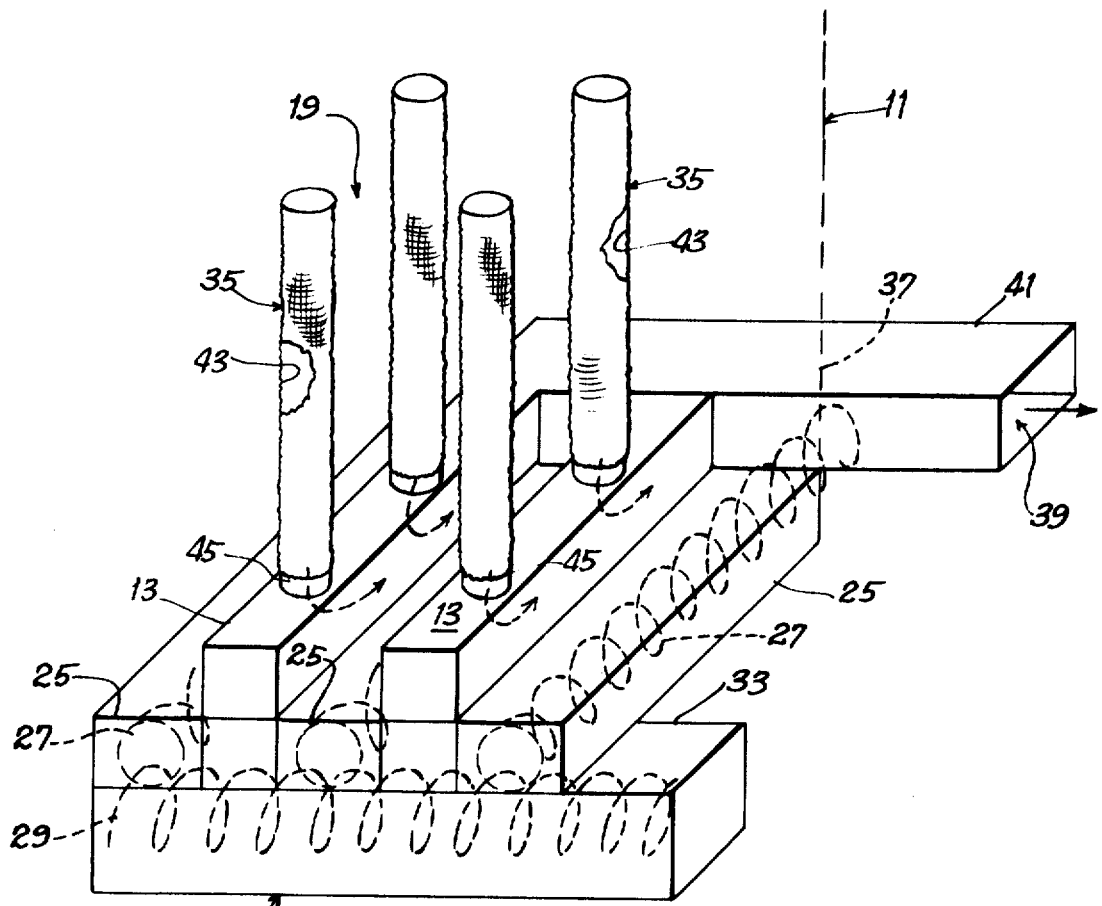
FIG. 1C is a perspective view of a section of the apparatus shown in FIG. 1B.
Figure 2:
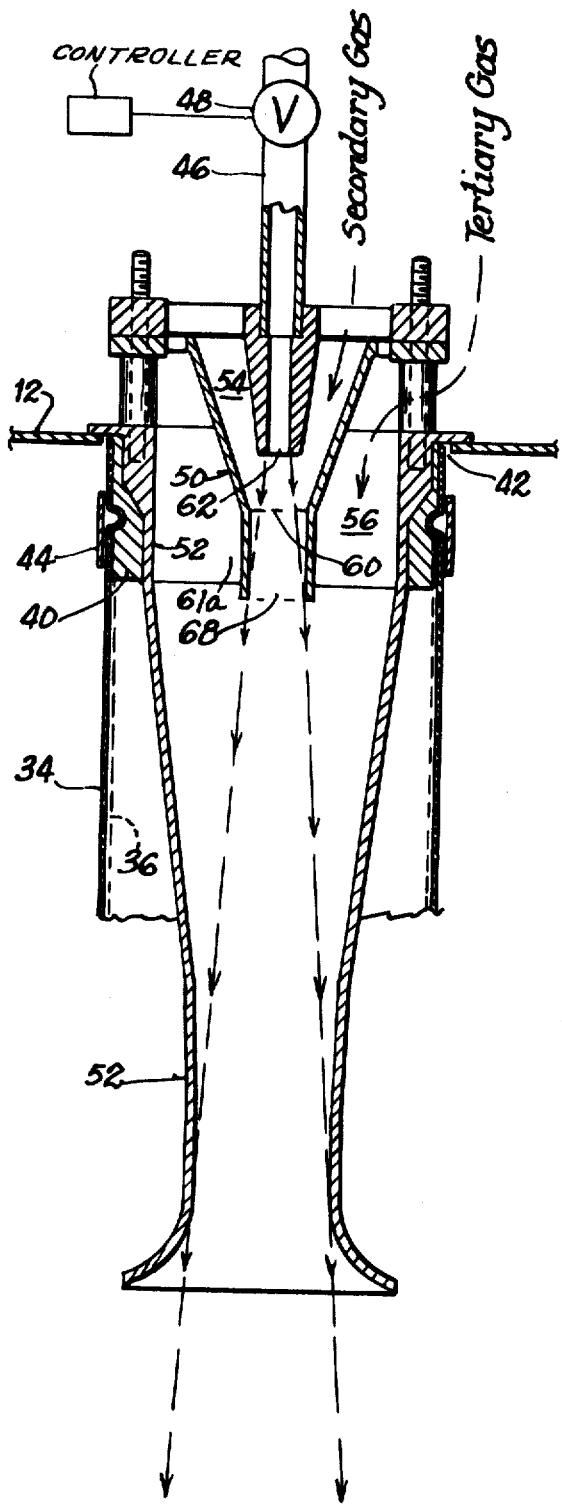
Figure 3:
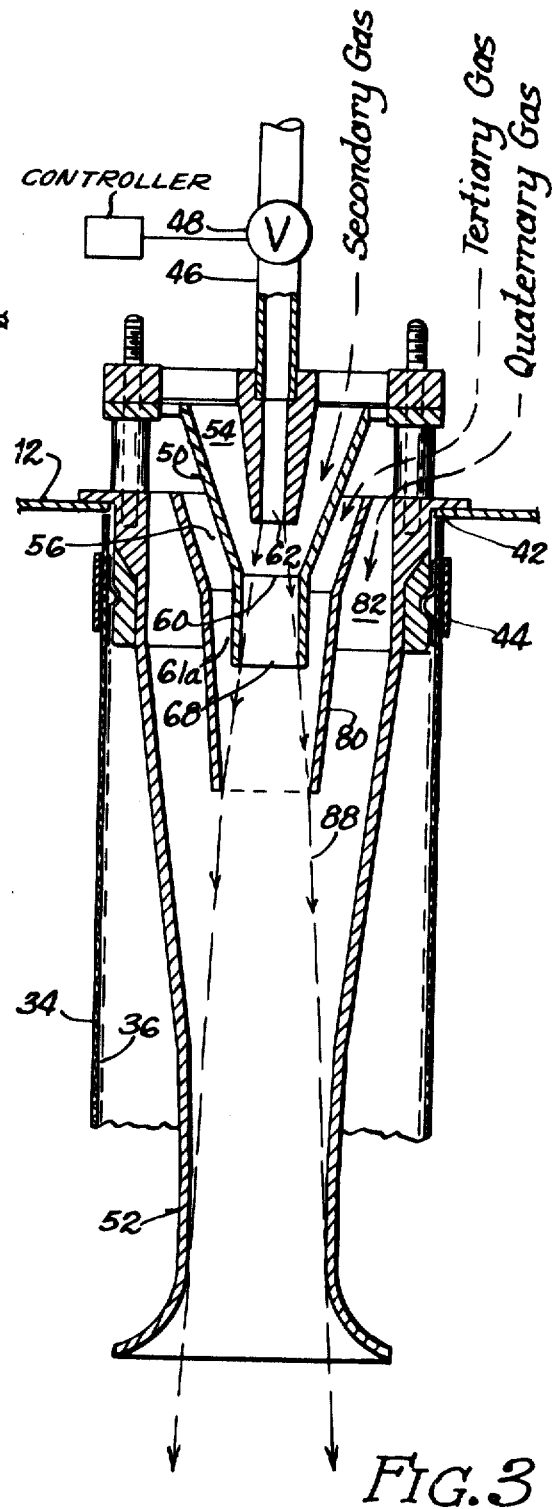

FIG. 2 is a schematic sectional elevational view of a portion of the filter apparatus shown in FIG. 1A with enlarged detail of the construction at the upper end portion of the filter tube section, showing the means for generating the pulse of high pressure gas for passage downwardly from the upper end portion of the filter tube; and FIG. 3 is a schematic sectional elevational view, similar to that of FIG. 2, showing a modification in the construction for generation of the jet burst of high pressure gas for filter cake removal.

As illustrated in FIG. 1A, the filter apparatus comprises an enclosed filter housing 10 subdivided by a horizontally disposed cell plate 12 into an upper clean gas plenum chamber 14 and a lower inlet plenum chamber 16 into which the gaseous material 18 to be processed for removal of suspended solids 20 is introduced through an inlet opening 22 in communication with the inlet plenum chamber 16.

The lower end portion of the inlet plenum chamber is formed with convergent walls 24 to define a hopper 26 for collection of the solid particles which fall gravitationally when removed from the filter element surfaces. A screw conveyor 28 operates in the trough 30 in the bottom of the hopper 26 for displacement of collected solids from the apparatus. Other means, such as a rotary air lock, may be used for removal of collected solids.

An outlet opening 32 communicates the clean gas plenum chamber 14 with the exhaust 9 of clean gas into the atmosphere or the exhaust of clean gas as a process of re-processing gas.

Suspended into the inlet plenum chamber 16 are one or more vertically disposed filter elements 34 in the form of elongate porous members, such as stockings or bags preferably formed of felted fabrics of such fibers as cotton, silk, hemp or other natural fibers, or glass, asbestos or the like inorganic fibers, or Orlon, Dacron or the like man-made fibers, or combinations thereof, or woven fabrics of such fibers as cotton, silk, hemp or other natural fibers or man-made fibers, or glass, asbestos or the like inorganic fibers or combinations thereof, but it is further preferred to fabricate the filter tube bag of fibrous fabrics characterized by good wear resistance, good chemical resistance and of fibers which are resistant to high temperatures to enable use in the treatment of gases exhausted at high temperature from such chemical operations as cement plants, aluminum plants, etc. The tubular filter member is closed at its lower end and is usually retained in its tubular shape by means of a suitable internal support, such as an open tubular frame 36 formed of wire screening or the like rigid, highly foraminous material.

Each filter tube bag is removably suspended from the cell plate 12 by a tubular section 40 fixed to one side of the cell plate 12 with an opening 42 through the cell plate. The tubular member is dimensioned to receive the upper open end portion of the filter tube 34 in telescoping relationship thereabout and it is secured in the assembled relation about the tubular section, as by means of a clamp 44.

Extending downwardly into the opening beyond the upper end of the filter tube is a source of primary gas in the form of a nozzle 46 with orifice 62 having diameters such as ⅛" to 1" in diameter for example and connected at its upper end to a source of supply of high pressure gas with suitable valve means 48 and controls for regulating the frequency and duration of burst of the high pressure primary gas to the nozzle 46.

Concentrically arranged about the nozzle 46 are two or more nozzle sections 50 and 52 each of increasing diameter to provide an annular space 54 between the nozzle 46 and the nozzle section 50 which is open at its upper end for the flow therethrough of secondary gas and an annular space 56 between the nozzle sections 50 and 52, which is also open at its upper end for the flow therethrough of tertiary gas, etc.

The nozzle section 50 is provided at its lower end with a tubular section which could be a converging section by extension of the converging upper walls, as illustrated at 80 axially aligned with the nozzle 46 but with the passage through the throat 60 being of larger dimension than the orifice 62 and spaced therefrom by an amount to enable the spreading cone of the jet of primary gas from the orifice 62 to flow in close proximity to the interior wall of the nozzle throat at 60 to generate a pumping action as the burst of gas issues from the orifice 62 for passage through the aligned nozzle or venturi section. Thus the secondary gas is drawn through the annular space 54 for addition to the primary gas passing through the throat 60 to generate a burst of gas having greater force and effect for issuance from the end 68 of the nozzle section.

As illustrated in FIGS. 1B and 1C, the filter apparatus comprises an upside down filter device embodying the features of the invention including an enclosed filter housing 11 subdivided by a cell plate into a horizontally disposed clean gas filter element plenum 13 and a dirty gas plenum chamber 19 into which the gaseous material 17 to be processed for removal of suspended solids 21 is introduced through an inlet opening 23 in communication with the dirty gas plenum chamber 19.

The lower end portion of the dirty plenum chamber is formed with a series of screw conveyor troughs 25 with cross screw conveyors 27 to collect the solid particles which wall gravitationally when removed from the filter element surfaces. Another screw conveyor 29 operates in the trough 31 to provide an air tight plug seal at extension 33 for displacement of collected solids from the apparatus.

An outlet opening 37 communicates with the clean gas filter element plenum 13 with the exhaust 39 of clean gas into the atmosphere or the exhaust of clean gas as a process or reprocessing gas from duct 41.

Suspended into the dirty air plenum chamber 19 are one or more vertically disposed filter elements 35 in the form of elongate porous members, such as stockings preferably formed of felted fabrics of such fibers as cotton, silk, hemp or other natural fibers, or rayon, nylon, Dacron or the like synthetic organic fibers, or glass, asbestos or the like inorganic fibers, or combinations thereof, or woven fabrics of such fibers as cotton, silk, hemp or other natural fibers or rayon, nylon, Dacron or the like man-made fibers, glass, asbestos or the like inorganic fibers or combinations thereof, but it is further preferred to fabricate the filter tube of fibrous fabrics characterized by good wear resistance, good chemical resistance, and of fibers which are resistant to high temperatures to enable use in the treatment of gases exhausted at high temperature from such chemical operations as cement plants, aluminum plants, etc. The tubular filter member is closed at its upper end and is usually retained in its tubular shape by means of a suitable internal support, such as an open tubular frame 43 formed of wire screening or the like rigid, highly foraminous material.

Each filter element is removably attached to the horizontally disposed cell plate defining the clean gas plenums 13 by a tubular section 45 at opening 47. The tubular member is dimensioned to receive the lower open end portion of the filter tube 35 in telescoping relationship thereabout and it is secured in the assembled relation about the tubular section 45 as by means of a clamp 49.

Extending upwardly into the opening beyond the lower end of the filter tube is a source of primary gas in the form of a nozzle 51 with orifice 53 having diameters such as ⅛" to 1" in diameter for example and connected at its lower end to a source of supply of high pressure gas with suitable valve means 55 and controls for regulating the frequency and duration of burst of the high pressure primary gas to the nozzle 51.

Concentrically arranged about the nozzle 51 are two or more nozzles and a venturi section 57 and 59, each of increasing diameter to provide an annular space 61a between the nozzle 51 and the nozzle section 57 which is open at its lower end for the flow therethrough of secondary gas and an annular space 63 between the nozzle and venturi sections 57 and 59 which is also open at its lower ends for the flow therethrough of tertiary gas, etc.

The nozzle section 57 is provided at its upper end with a converging section 65 axially aligned with the nozzle 51 but with the passage through the throat 67 being of larger dimension than the orifice 53 and spaced therefrom by an amount to enable the spreading cone of the jet of primary gas from the orifice 53 to flow in close proximity to the interior wall of the nozzle throat at 67 to generate a pumping action as the burst of gas issues from the orifice 53 for passage through the aligned nozzle section. Thus the secondary gas is drawn through the annular space 61a for addition to the primary gas passing through the throat 67 to generate a burst of gas having greater force and effect for issuance from the end 69 of the nozzle section.

It will be apparent that third, fourth, etc. concentrically arranged nozzles may be provided with increasing spaced relationship about the described nozzles to provide the necessary spaces for the access to quaternary or quinterary gas with the lower ends constructed to define additional throat sections with outlets from previous nozzles thereby further to increase the force of gas issuing from the multiple nozzle an venturi arrangement into the filter tube.

Such accentuation of the gas burst even with a substantial decrease in the length of burst enables considerable savings in the amount of high pressure gas employed while decreasing the amount of time taken up by the cleaning cycle. The increase in the force of burst whereby the removal of solids from the pores of the filter tube or filter surface is more complete enables operation with lower pressure drop and corresponding decrease in filter drag, all of which adds up to a more efficient and effective operation of filtration.

The pressure of the primary gas should be higher than atmospheric pressure, such as within the range of 20–200 p.s.i. and preferably within the range of 50–125 p.s.i., with a time of burst measurable in milli-seconds, such as from 5 to 250 milli-seconds, and preferably 15 to 100 milli-seconds.

A triple nozzle and venturi sequence in the multiple jet arrangement of this invention is illustrated in FIG. 3 by modification of the construction shown in FIG. 2 to add a nozzle 80 of greater diameter than the nozzle 50 but less than that of the open end of the filter tube 34 to provide an annular space 82 between section 52 and section 80 through which quaternary gas can flow for admixture with the burst of gas issuing from the previous nozzle section 80.

The final section is preferably a complete venturi in critical vertical and axial alignment (staged) with the prior or previous nozzles whereby the divergent jet 88 of gas flows in close proximity to the walls of the final venturi, creating a reduction in absolute pressure and causing a pumping action for drawing quaternary gas into the previous high energy gas stream.

It will be apparent from the foregoing that the sequence can be continued to increase the number of nozzles aligned further to magnify the force of the burst of gas introduced into the filter tubes but it has been found that a point of diminishing return is encountered when the number of nozzles followed by a venturi in sequence exceeds about six and best results are generally secured with two, three or four nozzles followed by a venturi.

Because of the augmentations of the burst of gas issuing from the last of the sequence of nozzles and venturi, in accordance with the practice of this invention, the duration of burst of high pressure gas can be greatly decreased and the amount of high pressure gas required to generate the gas burst can also be materially reduced, as can be illustrated by the following comparison between an apparatus currently being marketed utilizing the principles disclosed in Reissue Pat. No. 24,954 similar to, but not of identical construction as that in the disclosure, and operated in accordance with the practice of this invention as illustrated in FIG. 2. Such reduction in duration of burst and in the amount of high pressure gas required to effect satisfactory cleaning contributes importantly to the decreased cost and expense in the operation of the filter device embodying the features of this invention.

Further, the increased force of the burst provides for more effective removal of the filter cake from the walls of the filter tubes with the result that the filter device of this invention does operate at lower pressure drop across the filter medium for removal of equivalent amounts of material, thereby to provide a further important contribution to the savings in cost of dust and dirt removal.

For purposes of comparison, use was made of the same filter bags in the same amounts and in the same arrangement in apparatus operating under the same conditions of dust in gas to be filtered and under the same conditions of rate of feed whereby substantially the same volume of gas containing substantially the same amount of the same dust or dirt was processed in equivalent time. Differences were effected only in the gas pressure required and in the duration of the initial burst for operating the respective units under optimum conditions.

Gas at 95 p.s.i. was used in the apparatus corresponding to Re. 24,954, while 75 p.s.i. was used in the apparatus of the invention as represented by FIG. 2. The former apparatus used an air orifice ¼" diameter and a pulse duration of 100 milli-seconds, while the apparatus of this invention used an orifice 0.339" with a pulse duration of 40–45 seconds. In each case, each of three rows of bags was pulsed every minute and observations taken of relevant data every five minutes.

As a measurement of efficiency, calculations were made to determine filter drag, as determined by dividing the pressure drop in inches W.G. with the gas to cloth ratio in the filter unit under test.

REISSUE PATENT NO. 24,954

| Time | Orifice meter pressure drop, before and after pulse | | Single bag pressure drop, before and during pulse | | Pressure drop across thimble floor, before and after pulse | |
|---|---|---|---|---|---|---|
| | Before | After | Before | During | Before | After |
| Initial | 4.15 | | 2.8 | | 3.1 | |
| Minutes: | | | | | | |
| 5 | 4.25 | 4.45 | 2.7 | [1]−.1 | 2.9 | 2.1 |
| 10 | 4.15 | 4.5 | 2.7 | −.1 | 3.0 | 2.15 |
| 15 | 4.3 | 4.5 | 2.75 | −.1 | 3.05 | 2.2 |
| 20 | 4.25 | 4.45 | 2.8 | −.1 | 3.1 | 2.25 |
| 25 | 4.3 | 4.45 | 2.85 | 0 | 3.15 | 2.3 |
| 30 | 4.25 | 4.4 | 3.0 | 0 | 3.3 | 2.45 |
| 35 | 4.2 | 4.4 | 3.1 | +.1 | 3.4 | 2.55 |
| 40 | 4.15 | 4.35 | 3.2 | +.1 | 3.45 | 2.55 |
| 45 | 4.15 | 4.35 | 3.2 | +.1 | 3.5 | 2.6 |
| 50 | 4.15 | 4.3 | 3.25 | +.1 | 3.5 | 2.6 |
| 55 | 4.1 | 4.25 | 3.35 | +.2 | 3.65 | 2.75 |
| 60 | 4.1 | 4.25 | 3.4 | +.2 | 3.65 | 2.75 |
| 65 | 4.1 | 4.3 | 3.45 | +.2 | 3.7 | 2.85 |
| 70 | 4.05 | 4.2 | 3.55 | +.3 | 3.85 | 2.95 |
| 75 | 3.95 | 4.15 | 3.75 | +.4 | 3.9 | 3.0 |
| 80 | 3.95 | 4.15 | 3.8 | +.4 | 4.0 | 3.1 |
| 85 | 3.9 | 4.1 | 3.9 | +.4 | 4.1 | 3.2 |
| 90 | 3.9 | 4.1 | 4.0 | +.5 | 4.15 | 3.25 |
| 95 | 3.9 | 4.05 | 4.0 | +.5 | 4.2 | 3.3 |
| 100 | 3.9 | 4.1 | 4.0 | +.5 | 4.2 | 3.3 |
| 105 | 3.8 | 4.0 | 4.1 | +.5 | 4.55 | 3.45 |
| 110 | 3.8 | 4.0 | 4.2 | +.6 | 4.45 | 3.55 |
| 115 | 3.75 | 3.95 | 4.25 | +.6 | 4.5 | 3.6 |
| 120 | 3.75 | 3.95 | 4.35 | +.6 | 4.55 | 3.65 |

[1] Minus sign=Pressure drop in backwash direction.

NOTES.—Avg. c.f.m.=547, air-cloth ratio 9.8 to 1. Dust loading 3.78 gr./ft.³ (Fine air cleaner test dust.) Avg. collector pressure drop before pulsing 3.79″ W.G. Avg. collector pressure drop after pulsing 2.97″ W.G. Filter drag before pulsing 0.39″/c.f.m., after 0.30″/c.f.m. Avg. filter drag 0.47″/c.f.m. Orifice meter press. Drop is a measure of input c.f.m. to the test collector.

FIGURE 2

| Time | Orifice meter pressure drop, before and after pulse | | Pressure drop across a bag, before and during pulse | | Pressure drop across thimble floor, before and after pulse | |
|---|---|---|---|---|---|---|
| | Before | After | Before | During | Before | After |
| Initial | 4.0 | | 1.8 | | 2.1 | |
| Minutes: | | | | | | |
| 5 | 4.15 | 4.25 | 1.85 | 0 | 2.1 | 1.6 |
| 10 | 4.15 | 4.25 | 1.85 | 0 | 2.1 | 1.55 |
| 15 | 4.2 | 4.3 | 1.85 | 0 | 2.15 | 1.6 |
| 20 | 4.2 | 4.3 | 1.9 | 0 | 2.15 | 1.6 |
| 25 | 4.2 | 4.3 | 1.85 | 0 | 2.1 | 1.6 |
| 30 | 4.2 | 4.3 | 1.9 | +.1 | 2.15 | 1.6 |
| 35 | 4.15 | 4.25 | 1.95 | +.1 | 2.2 | 1.65 |
| 40 | 4.15 | 4.25 | 2.0 | +.1 | 2.2 | 1.65 |
| 45 | 4.15 | 4.25 | 2.0 | +.1 | 2.25 | 1.7 |
| 50 | 4.15 | 4.25 | 2.0 | +.1 | 2.25 | 1.7 |
| 55 | 4.15 | 4.25 | 2.0 | +.1 | 2.25 | 1.65 |
| 60 | 4.15 | 4.25 | 2.05 | +.2 | 2.3 | 1.7 |
| 65 | 4.15 | 4.25 | 2.05 | +.2 | 2.3 | 1.7 |
| 70 | 4.15 | 4.25 | 2.1 | +.2 | 2.35 | 1.75 |
| 75 | 4.15 | 4.25 | 2.15 | +.2 | 2.4 | 1.75 |
| 80 | 4.15 | 4.25 | 2.2 | +.3 | 2.4 | 1.75 |
| 85 | 4.1 | 4.2 | 2.25 | +.2 | 2.45 | 1.8 |
| 90 | 4.1 | 4.2 | 2.3 | +.2 | 2.45 | 1.8 |
| 95 | 4.1 | 4.2 | 2.3 | +.2 | 2.5 | 1.8 |
| 100 | 4.1 | 4.2 | 2.25 | +.2 | 2.5 | 1.8 |
| 105 | 4.1 | 4.2 | 2.25 | +.2 | 2.45 | 1.8 |
| 110 | 4.1 | 4.2 | 2.25 | +.2 | 2.5 | 1.8 |
| 115 | 4.1 | 4.2 | 2.25 | +.2 | 2.5 | 1.85 |
| 120 | 4.1 | 4.2 | 2.25 | +.2 | 2.5 | 1.85 |

NOTES.—Avg. c.f.m.=550, air-cloth ratio 9.8:1. Dust loading 3.74 gr./ft.³ (Fine air cleaner test dust.) Avg. collector pressure drop before pulsing 2.32″ W.G. Avg. collector pressure drop after pulsing 1.78″ W.G. Filter drag before pulsing 0.24″/c.f.m. Filter drag after pulsing 0.18″/c.f.m. Avg. filter drag 0.21″/c.f.m., or 60.5% of the filter drag for Re. 24,954. Orifice meter press drop is a measure of input c.f.m. to the test collector.

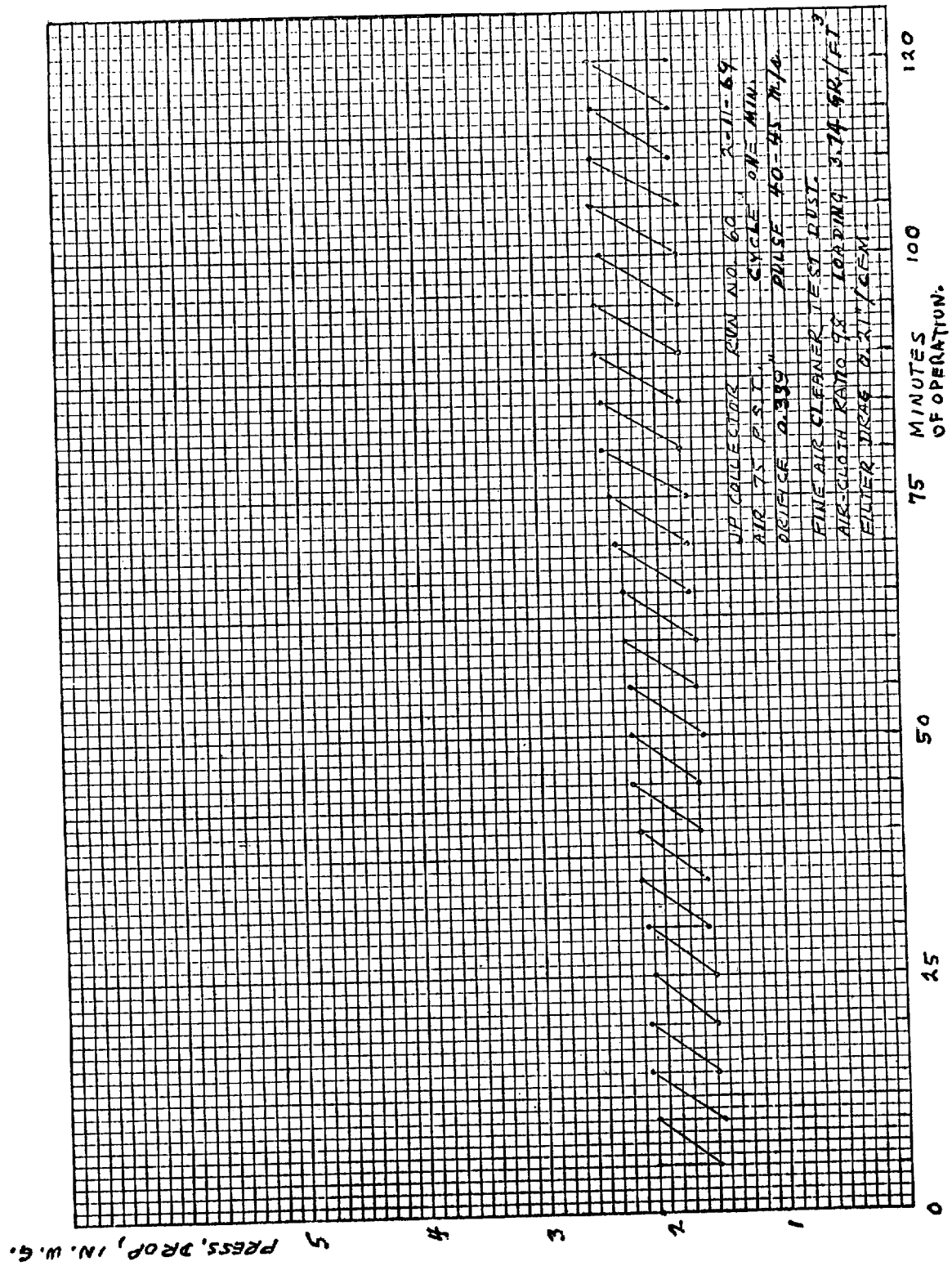

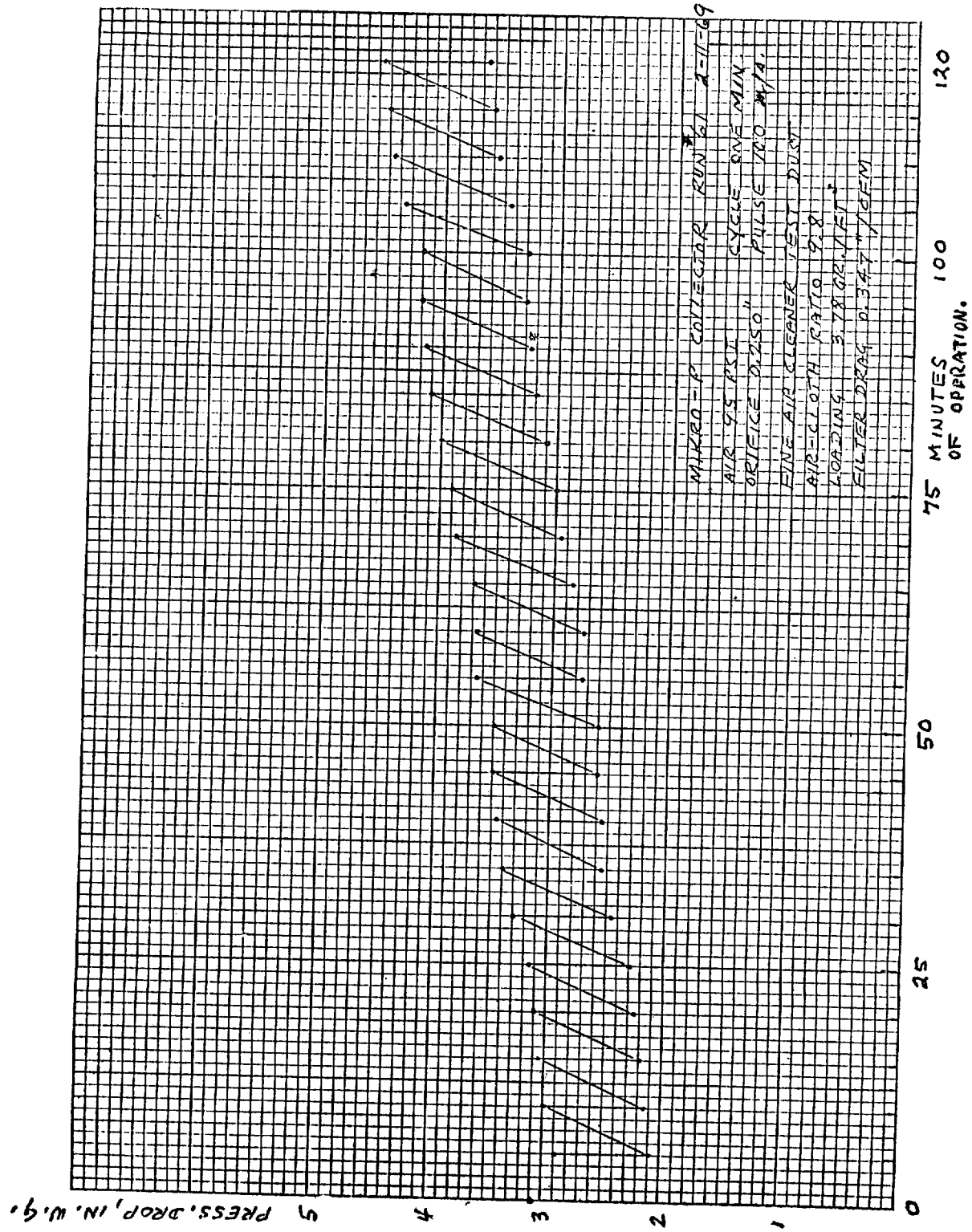

It will be noted from the foregoing tabulations that the unit of this invention operates at considerably lesser pressure differential through the filter medium which enables filtration to be effected either in greater gas volumes or with less power and thereby to increase the efficiency of operation of the unit. Average filter drag with the unit of this invention gave a value of 0.21 inch W.G./c.f.m. as compared to an average filter drag of 0.347 inch W.G./c.f.m. for the structure representative of the Reissue patent. Use was made of 60% as much pressurized gas with the apparatus of FIG. 2 thereby to provide a 30–40% savings in compressed air as well as a 40% savings in filter drag.

The graphs illustrate comparative tests showing pressure drop with respect to time during the continuous operation of the respective units with fine air cleaner test dust suspended in air to be filtered with the unit representing the practice of this invention and illustrated by the curve having the lower values, operating with an air pulse of 40–45 milliseconds of 75 p.s.i. air using a nozzle having an orifice of 0.339 inch diameter and with the unit representative of the reissue patent operating with air pressure of 95 p.s.i. a duration of pulse of 100 milliseconds and with the 0.25 diameter orifice.

It will be noted from the graphs that the pressure drop is of a constant lower value with the apparatus of this invention as compared to the pressure drop across the filter medium of the prior art device, operating under the same load conditions.

It will be understood that changes may be made in the details of construction, arrangement and operation without departing from the spirit of the invention, especially as defined in the following claims.

We claim:

1. An apparatus for gaseous filtration to effect removal of suspended solids, including a housing, divided into a dirty gas section and a filtered gas section by means of a tube sheet, said housing containing two or more filter tubes, the open upper end of each filter tube being attached to said tube sheet, said housing including a dirty gas inlet duct, a filtered gas outlet duct, a hopper, means for removing collected solid matter from said hopper without loss of filter gas flow, means for flowing gaseous medium containing suspended solids to be removed through the walls of the filter tubes in normal filter flow from the outside to the interior of the filter tubes whereby solids separated from the gaseous medium collect on the outer walls of the filter tubes as a filter cake, the improvement wherein collected solids are removed from the surface of a portion of the filter tubes without stopping normal filter flow comprising a primary nozzle extending into the filter tube having its outlet upstream of the open end of the filter tube as measured by normal filter flow and in endwise alignment therewith, a source of primary pressurized gas connected with the primary nozzle, means for regulating the flow of pressurized gas to provide short bursts of pressurized gas to the primary nozzle, additional nozzles upstream of the primary nozzle as measured by normal filter flow and axially aligned one with another and the primary nozzle, each nozzle having its upstream end portion nesting in the downstream end portion of the adjacent upstream nozzle in telescoping relation, the downstream end portion of each nozzle being dimensioned to be larger in cross-section than the portion of the downstream nozzle nested therein to provide a spaced relation between the telescoping walls of the nozzles with the axially telescoping portion of the downstream nozzle axially spaced from the upstream end of the upstream nozzle by an amount whereby the gas issuing from the nozzle flows into close proximity to the wall of the respective upstream nozzle as it spreads to form a cone, the downstream end of each of the additional nozzles being in flow communication with the filtered gas outlet duct, whereby the final burst of gas issuing from the last nozzle into the interior of the filter tube includes the initial jet of high pressure gas projected from the primary nozzle plus additional increments of air drawn in by each succeeding nozzle.

2. An apparatus as claimed in claim 1 in which the total number of nozzles below the primary nozzle is between two and six.

3. An apparatus as claimed in claim 1 in which the total number of nozzles below the primary nozzle is between two and four.

4. An apparatus as claimed in claim 1 in which each nozzle other than the primary nozzle communicates directly with atmospheric air or other low pressure gas source which is drawn through each said nozzle or venturi by the reaction to the burst of air or gas projected into each said nozzle or venturi from the preceding nozzle.

5. An apparatus for gaseous filtration to effect removal of suspended solids, including a housing, divided into a dirty gas section and a filtered gas section by means of a horizontally disposed clean gas filter plenum chamber, said housing containing two or more filter tubes, the open lower end of each filter tube being attached to said horizontally disposed clean gas plenum chamber, said housing including a dirty gas inlet duct, a filtered gas outlet duct, a hopper, means for removing collected solid matter from said hopper or container without loss of filter gas flow, means for flowing gaseous medium containing suspended solids to be removed through the walls of the filter tubes in normal filter flow from the outside to the interior of the filter tubes whereby solids separated from the gaseous medium collect on the outer walls of the filter tubes as a filter cake, the improvement wherein collected solids are removed from the surfaces of a portion of the filter tubes without stopping normal filter flow comprising a primary nozzle for directing a stream of gas upwardly into the tube and extending upstream through the open end of the tube in endwise alignment therewith, as measured by normal filter flow, a source of primary pressurized gas connected with the primary nozzle, means for regulating the flow of pressurized gas to said nozzle to provide short bursts of pressurized gas to the nozzle, additional nozzles upstream of the primary nozzle as measured, by normal filtering flow and axially aligned one with another and the primary nozzle in the filter tube, each nozzle having its upstream end portion nesting in the downstream end portion of the adjacent upstream nozzle in telescoping relation, the downstream end portion of each nozzle being dimensioned to be larger in cross-section than the portion of the downstream nozzle nested therein to provide a spaced relation between the telescoping walls of the nozzles with the telescoping portion of the downstream nozzle axially spaced from the upstream end portion of the upstream nozzle by an amount whereby the gas issuing from the nozzle flows into close proximity to the wall of the respective downstream nozzle as it spreads into a cone, the downstream end of each of the additional nozzles being in flow communication with the clean gas plenum chamber, whereby the final burst of gas issuing from the last nozzle into the interior of the filter tube includes the initial jet of high pressure gas projected from the primary nozzle plus additional increments of air drawn in by each succeeding nozzle.

6. An apparatus as claimed in claim 5 in which the total number of nozzles above the primary nozzle is between two and six.

7. An apparatus as claimed in claim 5 in which the total number of nozzles above the primary nozzle is between two and four.

8. An apparatus as claimed in claim 5 in which each nozzle other than the primary nozzle communicates directly with atmospheric air or other low pressure gas source which is drawn through each said nozzle or venturi by the reaction to the burst of air or gas projected into each said nozzle or venturi from the preceding nozzle.

(References on following page)

References Cited

UNITED STATES PATENTS 1,031,722  7/1912  Leblanc _____ 230—112

FOREIGN PATENTS 225,059  10/1959  Australia.
248,453  12/1963  Australia.

FRANK W. LUTTER, Primary Examiner
B. NOZICK, Assistant Examiner

U.S. Cl. X.R.

55—341